United States Patent
Borah et al.

(10) Patent No.: US 11,580,246 B2
(45) Date of Patent: Feb. 14, 2023

(54) CRYPTOGRAPHIC DATA ENCODING METHOD WITH ENHANCED DATA SECURITY

(71) Applicant: Amazon Technologies, Inc., Seattle, WA (US)

(72) Inventors: Himangshu Ranjan Borah, Seattle, WA (US); Rohan Gurappagouda Patil, Seattle, WA (US); Pedro Henrique Almeida Tanaka, Seattle, WA (US); Michael Arthur Ten-Pow, Seattle, WA (US); Han Wu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 16/871,724

(22) Filed: May 11, 2020

(65) Prior Publication Data

US 2021/0350016 A1 Nov. 11, 2021

(51) Int. Cl.
*G06N 3/08* (2006.01)
*H04L 67/02* (2022.01)
(Continued)

(52) U.S. Cl.
CPC ...... *G06F 21/6227* (2013.01); *G06F 16/9532* (2019.01); *G06F 21/6245* (2013.01);
(Continued)

(58) Field of Classification Search
CPC ............ G06F 21/6227; G06F 16/9532; G06F 9/44526; G06F 21/6245; G06N 5/04;
(Continued)

(56) References Cited

U.S. PATENT DOCUMENTS

| | | | | |
|---|---|---|---|---|
| 2010/0169293 A1* | 7/2010 | Gerber | .................. | G06F 16/951 707/706 |
| 2011/0066607 A1* | 3/2011 | Wong | .................. | G06F 16/9038 707/706 |

(Continued)

FOREIGN PATENT DOCUMENTS

| | | | | | |
|---|---|---|---|---|---|
| WO | WO-2014081727 A1 | * | 5/2014 | ........... | G06F 16/951 |
| WO | WO-2016154117 A1 | * | 9/2016 | ............. | G06F 16/31 |

OTHER PUBLICATIONS

International Search Report and Written Opinion dated Jul. 9, 2021, in International Patent Application No. PCT/US2021/030169, filed Apr. 30, 2021.

*Primary Examiner* — Joseph P Hirl
*Assistant Examiner* — Aayush Aryal
(74) *Attorney, Agent, or Firm* — Davis Wright Tremaine LLP

(57) ABSTRACT

Data security and privacy are improved by a client providing a hashed version of collected data to a remote analysis service, and having the analysis service determine the relevancy of the data from the hashes before requesting the plaintext of the data. In one example, a browser plug-in obtains data which is divided into overlapping three-character sequences, and the sequences are hashed to produce a sequence of hashes. The sequence of hashes is sent by the plug-in to the remote service, which uses the hashes to determine if the associated data is relevant to the analysis performed by the remote service, without requiring access to the associated plaintext. After making the determination, the remote service may request that relevant data be provided to the service in plaintext form, while data that is not relevant need not be sent to the remote service.

20 Claims, 9 Drawing Sheets

(51) Int. Cl.
| | |
|---|---|
| *G06F 21/62* | (2013.01) |
| *G06F 16/9532* | (2019.01) |
| *G06N 20/00* | (2019.01) |
| *G06N 5/04* | (2023.01) |
| *H04L 9/06* | (2006.01) |
| *H04L 9/40* | (2022.01) |
| *G06F 9/445* | (2018.01) |

(52) U.S. Cl.
CPC ............... *G06N 5/04* (2013.01); *G06N 20/00* (2019.01); *H04L 9/0643* (2013.01); *H04L 63/0428* (2013.01); *G06F 9/44526* (2013.01)

(58) Field of Classification Search
CPC ........ G06N 20/00; G06N 3/08; H04L 9/0643; H04L 63/0428; H04L 67/02
See application file for complete search history.

(56) References Cited

U.S. PATENT DOCUMENTS

| | | | |
|---|---|---|---|
| 2014/0122291 A1* | 5/2014 | Sampathkumaran | ........................ G06Q 30/0242 705/26.8 |
| 2014/0372216 A1* | 12/2014 | Nath | .................. G06Q 30/0256 705/14.54 |
| 2017/0092264 A1 | 3/2017 | Hakkani-Tur et al. | |
| 2017/0337397 A1* | 11/2017 | Tang | ........................ H04L 63/20 |
| 2018/0309579 A1 | 10/2018 | Martin et al. | |

* cited by examiner

CRYPTOGRAPHIC DATA ENCODING METHOD WITH ENHANCED DATA SECURITY

BACKGROUND

Entities often collect significant amounts of user data for use to improve the user experience. This data is sometimes traceable to a particular user. Therefore, although this information is generally collected with the permission of the user, many users are concerned about controlling the use of data associated with them. Data misuse or loss can be a huge problem and can even result in fines or legal actions against the entity. Therefore, data privacy and security are important considerations when dealing with sensitive user-identifiable information.

BRIEF DESCRIPTION OF THE DRAWINGS

Various techniques will be described with reference to the drawings, in which.

DETAILED DESCRIPTION

Figure 1:
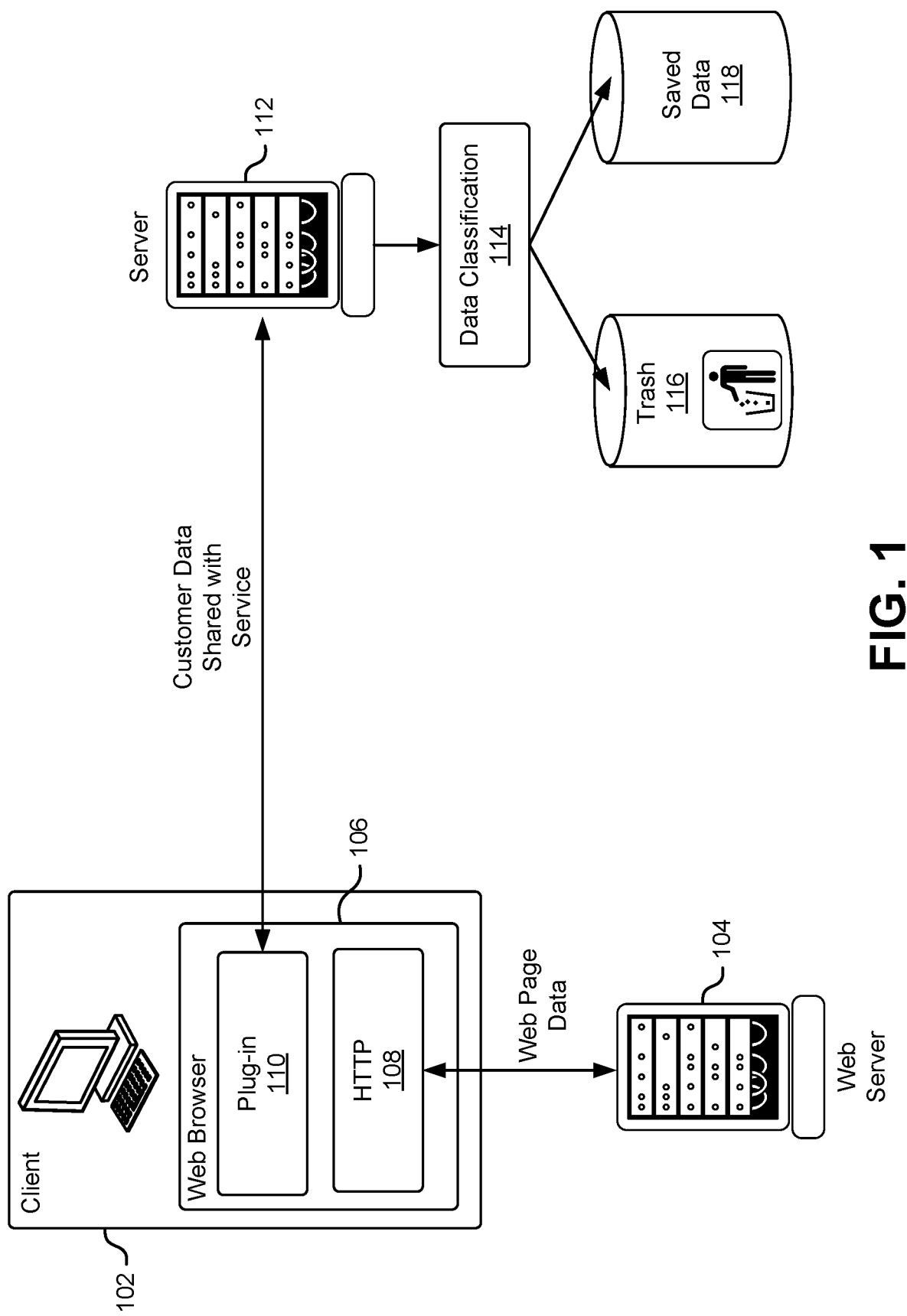
FIG. 1 illustrates a system that analyzes user data collected via a browser plug-in, in an embodiment.

The present document describes a system and method to encode and distribute user-associated information in a way that, in various examples, provides improved security for the information, and improves the privacy of the user. In at least one example, with the consent of the user, search queries entered by a user are obtained by a browser extension. Each search query, or other piece of text information, is divided into a series of character sequences, and each character sequence is hashed. The resulting hashes are sent to a remote analysis service, and the service, using a database, a machine-learned model, or a translator, processes the hashes to determine a characteristic of the associated query. In various examples, the server model or database is trained using a matching hash algorithm. In one example, the service determines whether the associated query is related to an item based on the hashes.

In one implementation, the service identifies an item that is related to the query using the hashes. Another implementation processes the hashes to determine if the associated search query is a search for an item. If, based on the sequence of hashes, the service determines that the associated query is a search for an item, the service requests the plaintext search query from the browser extension, and the plaintext query is sent to the service for additional processing. In this way, the amount of search information shared with the service is reduced, thereby increasing the security and privacy of the user. In some implementations, the service may be implemented with a plurality of computer servers or a server cluster. For example, a first server may determine the nature of the search query by analyzing the sequence of hashes, and a second server may request the plaintext of the search query after obtaining the analysis result from the first server.

In one example, a browser plug-in works with a network-based analysis service to provide item-comparison information. When a user loads a web page that includes item information, the plug-in scans the current web page, and identifies text that could include item information. Before sending the item information to a service, the plug-in divides the text into a plurality of character sequences which, in some implementations, may be overlapping with each other. In one example, the item information is divided into overlapping three-character sequences starting with each character in the item information. The plug-in generates a hash for each three-character sequence, which is then limited to reduce the amount of information transmitted. The plug-in then transmits the hashes to the service, and the service processes the hashes to determine if the associated information is "item related." For some examples, by making the determination using only the hashes, information that is not "item related" need not be revealed in its plaintext form to the service. In some examples, the techniques described herein can be used to identify a portion of a web page that requires additional analysis while excluding other portions that are not related to the analysis to be performed, without revealing the plaintext contents of the web page to the analysis service.

Various examples may be applied to browsing. For example, users browsing often engage in comparison of items to find the best mix of features and costs. The cost of item comparison has been steadily declining with the proliferation of the internet. Often, entities provide superior items in comparison to traditional brick-and-mortar stores, and this has driven more and more users to visit entities to learn about item options before making a selection. In one example, an item-comparison browser plug-in helps facilitate item comparison and reduces the cost of item discovery. Users install the plug-in which adds a toolbar to their browser, (Silk (Trademark of Amazon), Chrome (Trademark of Google), Firefox (Trademark of Mozilla), etc.). When the user visits a site that contains item information (such as mentioning a wireless headset or other item), the plug-in displays relevant options from the entities.

In general, providing this information to the user requires sharing some information with the entities. As part of the installation and use the plug-in, users give the entities the right to access data that is collected by the toolbar. This data may be subject to stringent privacy policies and may, for example, include information on the sites visited through the bowser. The data may also include page information such as data on paid and organic search results.

In at least one example, to improve the privacy of the user, the data collected by the plug-in is not linked to a user but rather to a hashed version of a user identifier. In general, only a small set of the actual information accessible to the plug-in is collected and made available for future use. For example, for some applications, only commercial or item-related queries need to be collected and tied to the hashed ID. Furthermore, in some examples, the hashed identifiers are recycled every three months to ensure that data cannot be reverse-engineered and used to learn about the users' private information. Many entities have policies that attempt to gain actionable insights while enforcing privacy and not collecting any personal identifiable information ("PII").

The determination of whether a user query is item-related can be a challenging problem. In some examples, to determine if a user query is item-related, the user query is typically transmitted to the servers and then the determination is made at the servers, and data is either stored in association with a hashed identifier or deleted. In this way, the data collected can still be tied to a hashed identifier associated with the user. Techniques described herein provide a method to significantly upgrade the privacy standard for the data collection by hashing the user query to a plurality of buckets and sending the sparse representation of the vector bucket to backend servers which perform the analysis without having access to the plaintext of the hashed data. In various examples, the sparse representation of the vector bucket satisfies the following requirements:

1) A computer or a human is unable to easily recover the original user query from the hashes provided, thus improving the privacy of the user.

2) The output follows a semantic structure which can be used to determine a characteristic of the query. For example, in some implementations, the hashes can be used to determine if the original user query is item related.

3) The mechanism of converting the user search query is sufficiently fast and lightweight such that the mechanism can be executed in a Web browser.

4) The hashes produced are compact so that excessive data transmission costs are not imposed.

Various techniques described herein satisfy these constraints. One example has three stages: hashing, scoring, model building. Scoring and model building occur on one or more remote servers. Hashing takes place in the user's browser. In one example, the algorithm to generate a hash from the user's query is as follows:

1) For a given search query (e.g., "iphone case"), add word starting and ending marks to the word and replace the space with an underscore (e.g., #iphone_case #).

2) The word is broken into letter n-grams (e.g., letter trigrams: #ip, iph, pho, hon, one, ne_, e_c, _ca, cas, ase, se #).

3) The letter n-grams are hashed to a fixed dimension such as $2^{15}$.

4) A word is represented using a sparse vector of its hashed letter n-grams (e.g., "iphone_case": (17686, 24863, . . . ). In one implementation, the directionality of the n-grams matches the directionality of the resulting hashes.

One advantage of using this approach is that while the number of English words can be unlimited, the number of hashed letter n-grams in English (or other similar languages) can be limited. Moreover, a letter n-gram maps the morphological variations of the same word to the points that are close to each other in the letter n-gram space, thus helping in inference using machine learning algorithms.

In at least one example, the process of analyzing user data obtained from the browser plug-in can be viewed as three stages:

A model building stage pre-processes the raw data (i.e., raw user queries which are already tagged) to train a machine learning classifier to determine if a query is item related or not. For a machine-learning implementation, the model building/training happens on the hashed language universe rather that the plain text.

An hashing stage which is executed in the user's browser to hash the user's query to a vector which is then transmitted to a computing resource provider's servers to perform the classification.

An scoring stage uses the above model with the output hashing stage to determine if the user's query is item related intent or not and tag the query for collection if item relatedness is determined.

As one skilled in the art will appreciate in light of this disclosure, certain embodiments may be capable of achieving certain advantages, including some or all of the following: (1) increasing the privacy of the data owner by refraining from sharing the plaintext of information with the analysis service until the relevancy of the information has been determined using the hashes of the information, (2) improving the performance of the system by offloading the determination of relevancy to the server, and (3) improving the security of information shared by the client by encoding the information to a series of non-reversible hashes.

FIG. 1 illustrates a system that analyzes user data collected via a browser plug-in, in an embodiment. The system includes a computer system and a number of software components comprising executable instructions stored in memory. The executable instructions, as a result of being executed by one or more processors of the system, cause the system to perform various functions described below. In the example illustrate in FIG. 1, a client computer system 102 communicates with a Web server 104 using a web browser 106. The web browser 106 implements an HTTP service 108 that sends and receives web requests and receives HTML web pages from the Web server 104. The web browser 106 includes a plug-in 110 which, in various examples, may be installed into the web browser 106 by a user of the client computer system 102.

In various embodiments, the client computer system 102 can be a personal computer system, a desktop computer system, a notebook computer system, a tablet computer system, a cell phone, a handheld device, an entertainment system, a set-top box, or computer system integrated into an appliance, automobile, or machine. For example, the computer system 102 may be an infotainment system in a motor vehicle, where the infotainment system includes a digital display and a connection to the Internet. The web browser 106 can be a web browser such as Internet Explorer, Safari, or Google Chrome, that is installed as an application on the client computer system 102. In some implementations, the web browser 106 is an integrated web browser that is part of the operating system of the client computer system 102.

In various examples, the plug-in 110 may add graphical elements to web pages presented to the computer user via the web browser 106. In one example, the plug-in 110 adds a toolbar to web pages presented via the web browser 106. In another example, the plug-in 110 adds links to text presented by the web browser 106. In yet another example, the plug-in 110 adds a sidebar, top or bottom header, or other region that adds graphical information to a web page presented by the web browser 106.

In at least one example, the plug-in 110 captures information from the web browser which is sent to an analysis server running on a computer server 112. In various examples, the computer server 112 may be a plurality of computer servers, a server cluster, or virtual computer system. In some examples, the computer server may be a container runtime or stateless computing service provided by a computing resource service provider. In one implementation, the information is web search information entered by the user of the client computer system 102. In another implementation, the information is all or part of a web page received by the web browser 106 from the web server 104. In some implementations, both pieces of information may be included in information sent to the server 112 by the plug-in 110.

Upon receiving this information from the plug-in 110, the computer server 112 performs a data classification operation 114. In one example, the data classification operation 114 determines whether the data is relevant or not to an analysis to be performed by the computer server 112. If the data is relevant, it is stored in a safe data store 118. If the data is not relevant, it is deleted and the storage space is recycled 116.

In one example, the information provided by the plug-in 110 is web page information and search query information that may or may not be related to a search for an item. Before sending the information to the computer server 112, the plug-in 110 encodes the information into a series of hashes. In one example, the series of hashes is generated by dividing the information into a set of three-character sequences, and then hashing each three-character sequence to generate the series of hashes. The series of hashes is sent to the computer server 112, and the data classification 114 is accomplished by analyzing series of hashes without having access to the plaintext of the information. In one example, the computer server 112 maintains a hashed database of item information and the data classification operation 114 is able to determine if the series of hashes corresponds to an item represented in the hashed database by comparing the hashes in the database to the hashes in the series.

In some implementations, the computer server 112 requests the plaintext of the information from the plug-in 110 if the analysis determines that the information is related to an item search, and does not request the plaintext of the information if it determines that the information is not related to an item search. In some examples, the plaintext is used to identify a particular item, and the computer server 112 provides information about the particular item to the user via the plug-in 110. In other examples, the computer server 112 is able to identify a particular item using the series of hashes only, and provides item information for the identified item via the plug-in 110.

In various examples, by hashing the information sent from the client computer system before it is provided to the server computer system 112. Information that is unrelated to the analysis performed can be identified as being unrelated, and then discarded, without having to reveal to the computer server 112 the specific nature of the information. Even though user data is only collected with the consent of the user, this improves the privacy of the user and reduces the potential liability of the service provider by restricting the possible uses of the information. In addition, the amount of information that needs to be sent between the client computer system 102 and server 112 may be reduced in some implementations as the hashes may be reduced to a relatively small bit space compared to the total volume of the plaintext information.

Figure 2:
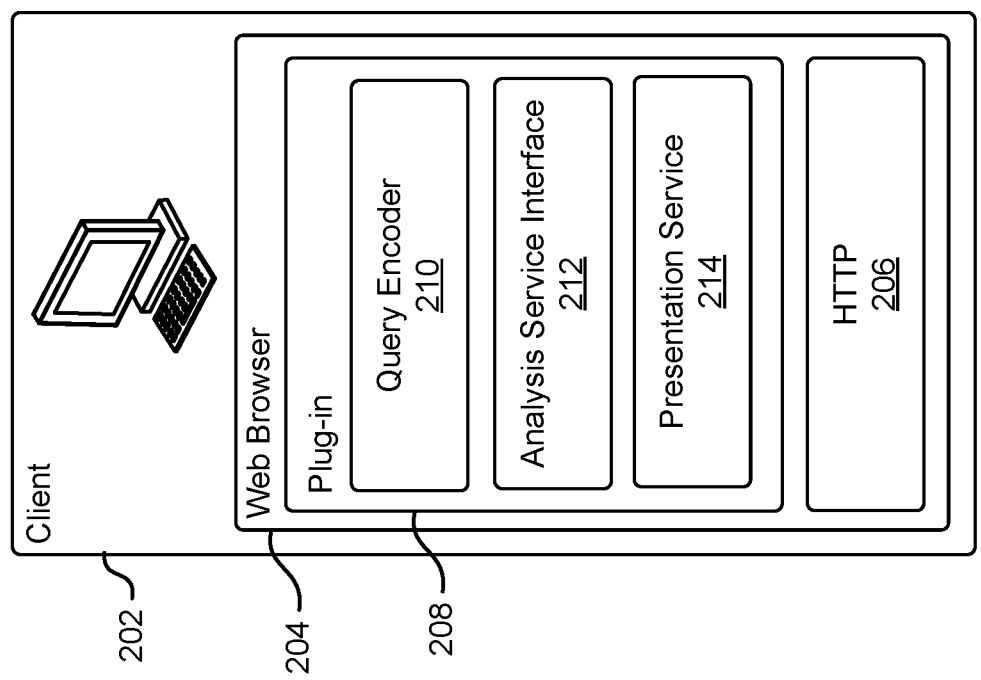
FIG. 2 illustrates a client computer system that provides user data to an analysis service, in an embodiment.

FIG. 2 illustrates a client computer system that provides user data to an analysis service, in an embodiment. In one example, a client computer system 202 hosts a web browser 204. The web browser 204 implements an HTTP protocol service 206 that communicates with Web servers to deliver content to the client computer system 202. The web browser 204 includes a plug-in 208 that may be installed by an administrator, installed by a user, or may be included with the web browser 204. In various embodiments, the client computer system 202 can be a personal computer system, a desktop computer system, a notebook computer system, a tablet computer system, a cell phone, a handheld device, an entertainment system, a set-top box, or computer system integrated into an appliance, automobile, or machine. The web browser 204 can be a web browser such as Internet Explorer, Safari, or Google Chrome, that is installed as an application on the client computer system 202. In some implementations, the web browser 204 is an integrated web browser that is part of the operating system of the client computer system 202.

In various examples, the plug-in 208 includes a query encoder 210, an analysis service interface 212, and a presentation service 214. The query encoder 210 obtains information entered by the user such as information entered into a web form or search dialogue, and web content retrieved from a website via the HTTP protocol service 206. This information is processed into a set of hashes by dividing the information into short sequences of characters, and then hashing each sequence. In one example, the information is divided into overlapping sequences of three characters, where each sequence begins with each letter of the information, and then each three-character sequence is hashed and truncated into a bit field. The resulting hashes are transmitted to a data analysis service via an analysis service interface 212. The analysis service interface 212 establishes a network connection to a remote analysis service on a remote server. The hashes are transmitted to the remote analysis service which analyzes the hashes to determine if the associated information requires additional processing by the analysis service. In one example, the analysis service compares the hashes to a database of item information, which is itself hashed, to determine if the associated information describes something within the database of item information. If the information is item related, the analysis service can either identify the item and provide the information to the plug-in 208, or request the plaintext of the information from the plug-in 208 and then return the appropriate item information. In other examples, the analysis service may perform types of analyses on the information and provide the results to the plug-in 208 via the analysis service interface 212.

Analysis information, such as item information, is presented to the user via the presentation service 214. The presentation service 214 adds HTML content to web pages presented by the browser 204. In at least some examples, the presentation service 214 adds a sidebar, top or bottom bar, or toolbar to web pages presented by the web browser 204. In one implementation, the presentation service 214 adds information to the displayed web page that describes an item identified by the analysis service on the web page.

Figure 3:
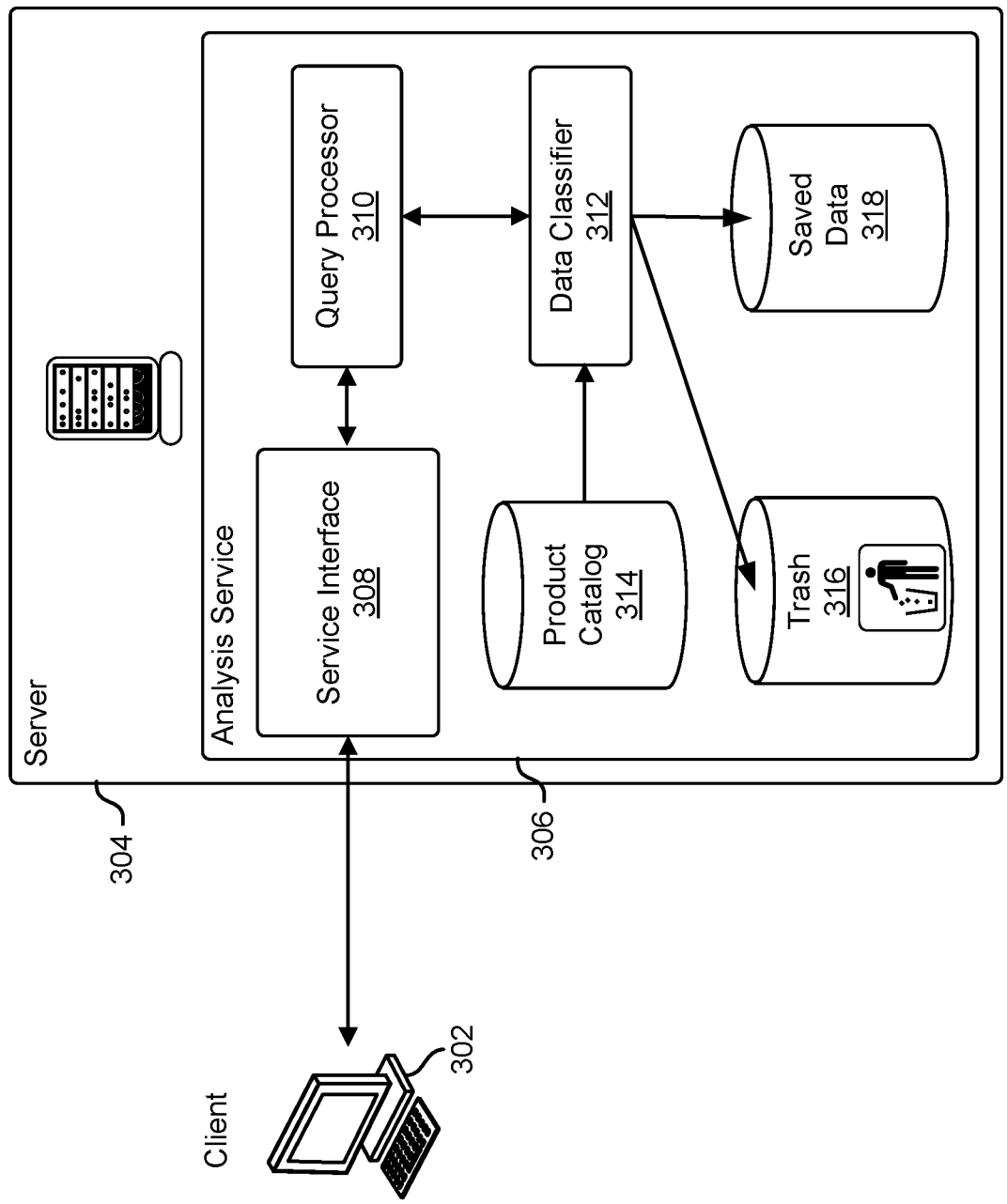
FIG. 3 illustrates a server computer system that analyzes user data provided by a browser plug-in, in an embodiment.

FIG. 3 illustrates a server computer system that analyzes user data provided by a browser plug-in, in an embodiment. In one example, a computer server 304 hosts an analysis service 306 that communicates with a client computer system 302 such as the client computer system described above. The server computer system 304 can be a computer system, desktop computer system, laptop computer system, virtual computer system, computer cluster, or software runtime environment provided by a computing resource service provider. The analysis service 306 is comprised of executable instructions stored on computer-readable media such as a hard disk or solid-state memory. The executable instructions, as a result of being executed by one or more processors of the server computer system 304, cause the server computer system 304 to perform various operations and functions described herein.

In one example, the analysis service 306 includes a service interface 308, query processor 310, the data classifier 312, an item catalog 314, the storage recycling service 316, and a data store 318. The service interface 308 communicates with a plug-in within a browser running on the client computer system 302. The service interface 308 communicates with the plug-in via a network interface. In some examples, the service interface 308 implements an encrypted communication protocol that encrypts the data exchanged between the analysis service and the client computer system. The query processor 310 obtains information from the plug-in either as plaintext or as a sequence of hashes representing information. When a sequence of hashes representing information is obtained by the query processor 310, the preprocessor passes the hashes to the data classifier 312 which compares the hashes to information in an item catalog 314. In one implementation, the item catalog 314 is a hashed set of item information, and the data classifier 312 compares the sequence of hashes to information in the item catalog 314 to determine if the information represented by the sequence of hashes is also present in the item catalog 314. In some examples, the data classifier 314 is able to identify a particular item within the item catalog 314 that is associated with the sequence of hashes. In other examples, the data classifier 314 is able to identify whether or not there is a particular item in the catalog that is associated with the sequence of hashes, but is not necessarily able to identify which item. In this way, the data classifier 312 is able to determine whether the sequence of hashes is associated with information that is relevant to the analysis to be performed by the analysis service 306 without having access to the plaintext information itself.

If the information is determined to be relevant to analysis to be performed by the analysis service 306, the hashes may be saved in the data store 318, and additional information may be requested from the client computer system 302. The additional information may include the plaintext of the search query, metadata related to the data represented by the hashes, or additional hashes of the data. If the information is determined not to be relevant to the analysis to be performed by the analysis service 306, the storage space allocated to storing the hash sequence may be recycled and the sequence of hashes deleted using the storage recycling service 316. The storage recycling service may, in some examples, overwrite the information and mark the storage space used for reuse.

Although the analysis service example described herein is used to determine whether a sequence of hashes describes information in an item database, those skilled in the art will realize that similar techniques may be used to identify other characteristics of the data to determine relevancy. For example, various implementations may determine that information provided by the client computer system 302 is associated with a particular user, or is relevant to a particular date range, or is data of a particular type. In this way, data that is collected but not relevant can be identified via a sequence of hashes before the data is shared with the analysis service 306 in plaintext form.

In some examples, after determining that a sequence of hashes identifies data relevant to analysis performed by the analysis service 306, the query processor 310 requests a plaintext version of the information from the plug-in running on the client computer system 302. In response to this request, the plug-in can return the information to the analysis service 306 in plaintext form.

The query processor 310, after determining that the sequence of hashes, is associated with relevant information, and after acquiring the relevant information is able to perform the analysis and provide the information to the plug-in running on the client computer system 302. The plug-in displays information to the user by adding the analysis information to the web page displayed to the user. In one example, the analysis service 306 identifies a particular item on the web page and displays item-comparison information from a website via the plug-in.

Figure 4:
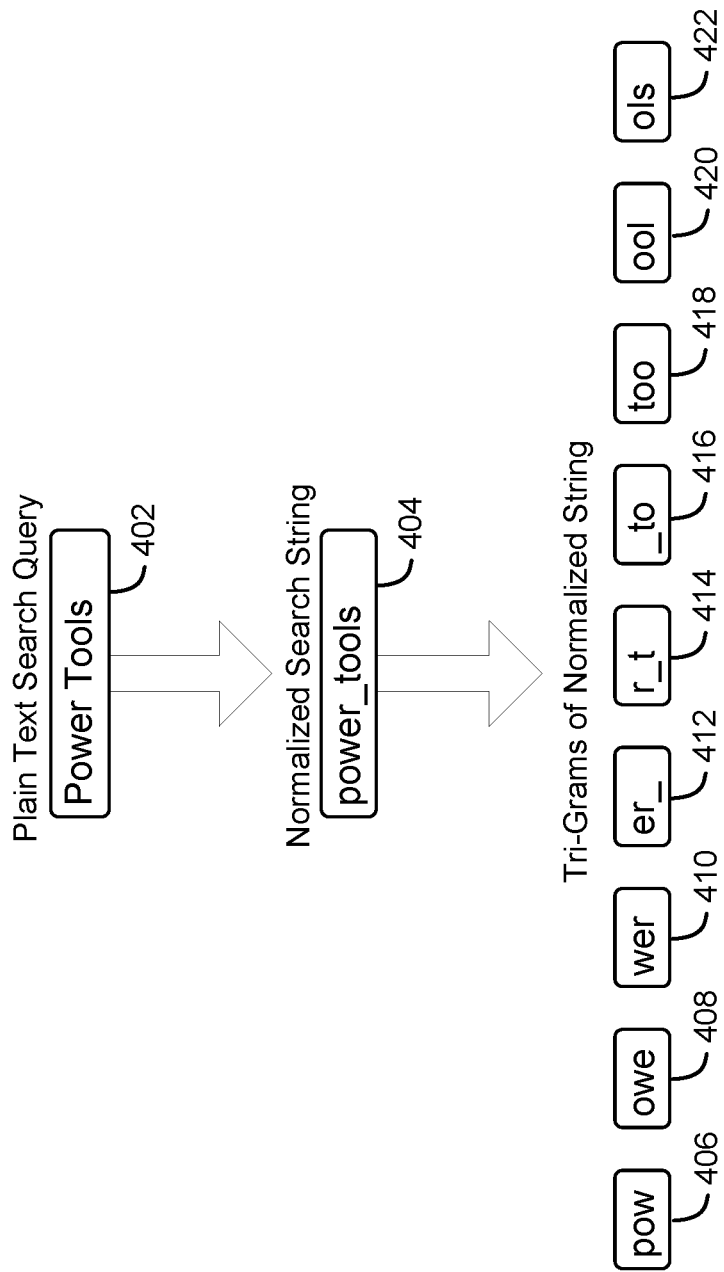
FIG. 4 illustrates an encoding of user data into a sequence of three-letter n-grams, in an embodiment.

FIG. 4 illustrates an encoding of user data into a sequence of three-letter n-grams, in an embodiment. The following example illustrates encoding and transmission of a search query, although similar techniques may be used for encoding and transmitting web page content to the analysis service.

A plaintext search query 402 is entered by the user into a web form, where it is then captured by a plug-in. The plug-in normalizes the search string by changing the text to lowercase and by replacing spaces and white space with underscores to produce a normalized string 404. The plug-in then converts the normalized string to a set of three letter n-grams (or tri-grams) 406, 408, 410, 412, 414, 416, 418, 420, and 422. Each n-gram begins at a successive letter of the normalized search string 404, and has a length of three characters. In some examples, padding characters may be added to the front or back of the normalized string. Each n-gram is then hashed to produce a hash value, and each hash value is truncated to a fixed-length bit space (such as 16 bits). Various types of hash algorithms may be used including checksums, cyclic redundancy codes, and cryptographic hashes.

Figure 5:
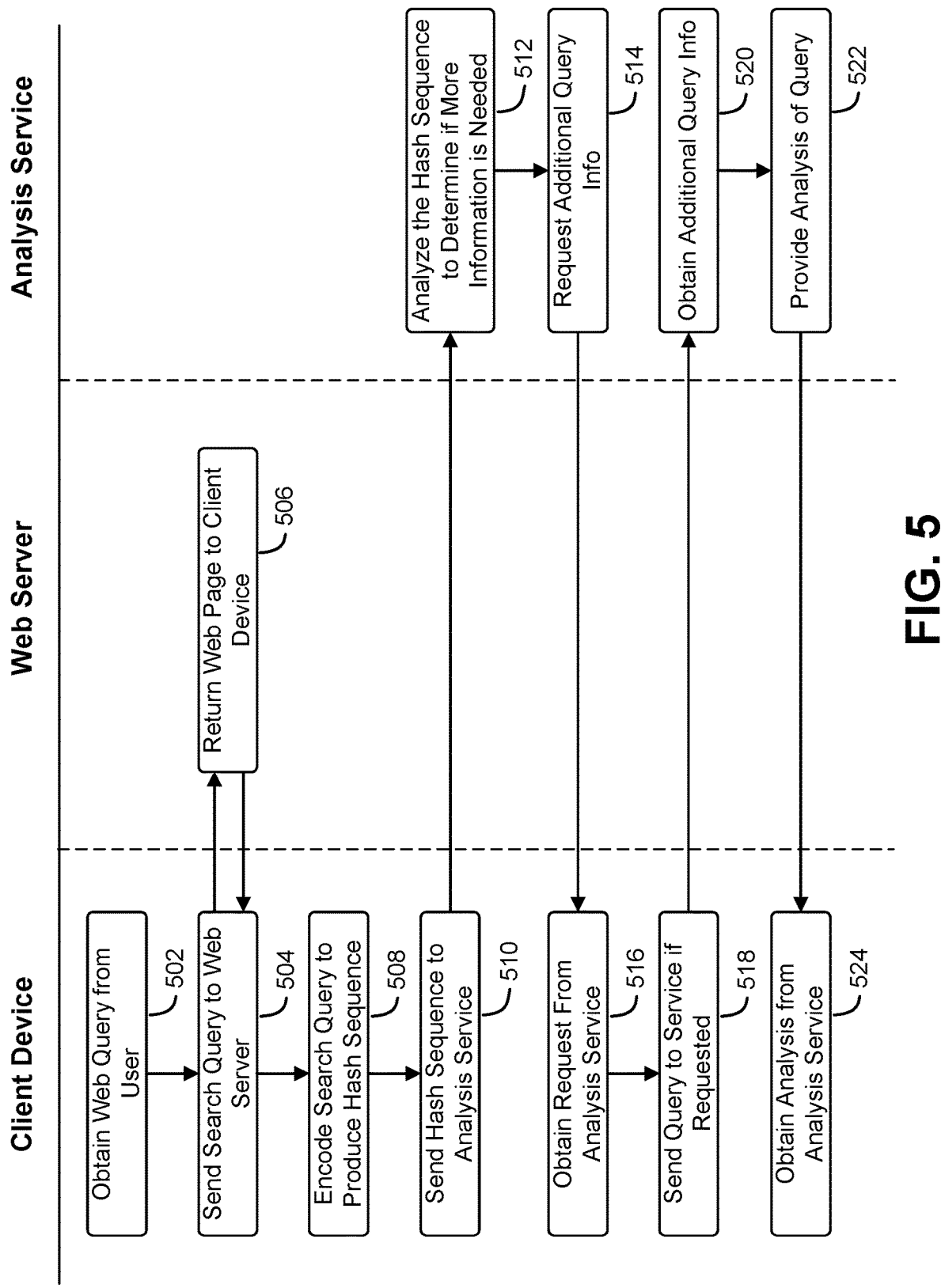
FIG. 5 illustrates a process that, as a result of being performed by a client computer system, web server, and analysis service, generates an analysis of user data, in an embodiment.

FIG. 5 illustrates a process that, as a result of being performed by a client computer system, web server, and analysis service, generates an analysis of user data, in an embodiment. In one example, the client device is a client computer system as described above, the analysis service is a service hosted by a server computer system as described above, and the web server is a web server on the Internet, an internal network, a private network, or device.

The process begins at block 502 with the client device obtaining a web query from user. The web query can be entered by the user as a URL, by the user clicking on a hyperlink on a web page, or by selecting a favorite or bookmark within the browser. At block 504, the client device identifies the Web server from the web query, and sends a request to the Web server for a web page identified within the query. In some examples, this is accomplished using a hypertext transport protocol ("HTTP") or a secure hypertext transfer protocol ("HTTPS") request.

At block 506, the Web server receives the request from the client device. As a result of receiving the request, the Web server retrieves or generates the requested web page, and returns the web page to the client device. In various examples, the web page is a document formatted in hypertext markup language ("HTML").

At block 508, the client service receives the web page from the Web server and analyzes the resulting web page to identify content of interest. In one example, a plug-in on the client device analyzes the web page and extracts text content from the page. The content of interest is encoded and hashed into a series of hashes as described above. In one example, the content is divided into three character sequences and each sequence is hashed to produce a sequence of hashes. At block 510, the plug-in sends the hash sequence to the analysis service.

At block 512, the analysis service receives the hash sequence and analyzes the hash sequence to determine if the hashes are associated with information relevant to the analysis performed by the analysis service. In one example, the hash sequence is compared to a hashed database of item information to determine if the hash sequence corresponds to information describing one of the items in the database. In another example, the hash sequence is provided to a neural network which is trained to determine if the hash sequence describes information in a database. If the hash sequence is not identified as being relevant to the analysis, the hash sequence can be deleted, and no further information is requested from the client device. However, if the hash sequence is identified as being associated with the relevant information, at block 514, the analysis service requests additional query information from the plug-in.

At block 516, the plug-in on the client device receives the request for additional information from the analysis service. At block 518, the plug-in identifies the plaintext information associated with the sequence of hashes and sends the plaintext information to the analysis service.

At block 520, the analysis service receives the plaintext information from the plug-in. In some examples, the plaintext information can be transmitted in encrypted form, and then recovered by the analysis service. Encryption may be accomplished using an encryption protocol such as transport layer security ("TLS"). At block 522, the analysis service produces an analysis from the information. In one example, the analysis is item-comparison information for an item identified by the information. At block 522, the analysis is returned to the client device.

At block 524, the client device receives the analysis from the analysis service at the plug-in. The plug-in generates a graphical representation of the analysis and injects the graphical representation into the web page displayed by the browser on the client device. In some examples, the graphical representation of the analysis is placed in a sidebar header or toolbar of the browser or web page.

Figure 6:
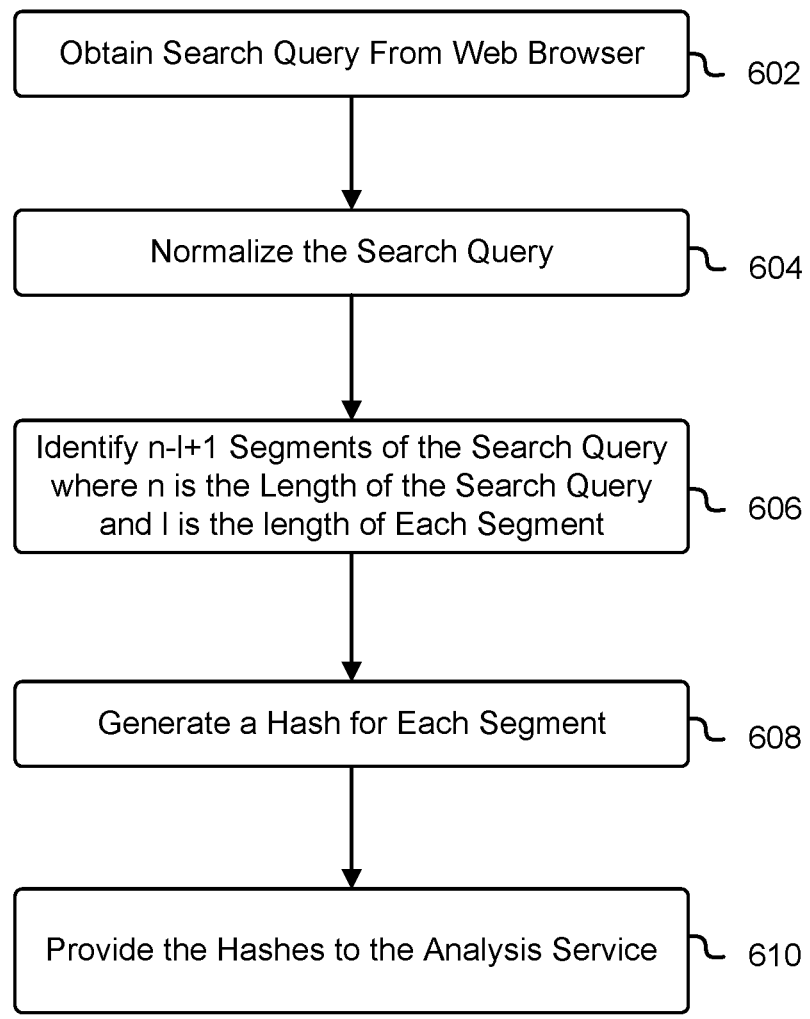
FIG. 6 illustrates a process that, as a result of being performed by a client computer system, encodes user data for transmission to an analysis service, in an embodiment.

FIG. 6 illustrates a process that, as a result of being performed by a client computer system, encodes user data for transmission to an analysis service, in an embodiment. The client computer system, in various examples, is a client computer system as described elsewhere in the present document. The process begins at block 602, with a client computer system obtaining a search query from a web browser. In some examples, the client computer system obtains web content from a web page provided as a result of the search query being submitted to a Web server. At block 604, the search query, and in some examples web content, are normalized by removing formatting characters, standardizing the case of characters, and removing unnecessary whitespace. At block 606, the client computer system generates a set of character segments from the search query and associated information. In one example, the information is divided into three-letter sequences, with each sequence beginning at sequential letters of the information. In other implementations, character sequences may be of various lengths and may overlap to various degrees. In some embodiments, character sequences may be nonoverlapping.

At block 608, each character sequence is hashed to produce a single hash from each sequence, and a plurality of hashes equal to the number of character sequences. Hashes can be generated using cryptographic or non-cryptographic hashes, and the hashes are truncated to fit within a limited bit space. In one implementation, the hashes are truncated so that the character sequences are not reversible from the hash. At block 610, the client computer system provides the plurality of hashes to the analysis service. The analysis service uses the hashes to determine if the information that was hashed is relevant to the analysis and if necessary requests the plaintext data based on the results of the determination. If the hashes indicate that the data is not relevant to the analysis, the date is not provided by the analysis service and remains confidential to the user of the client computer system.

Figure 7:
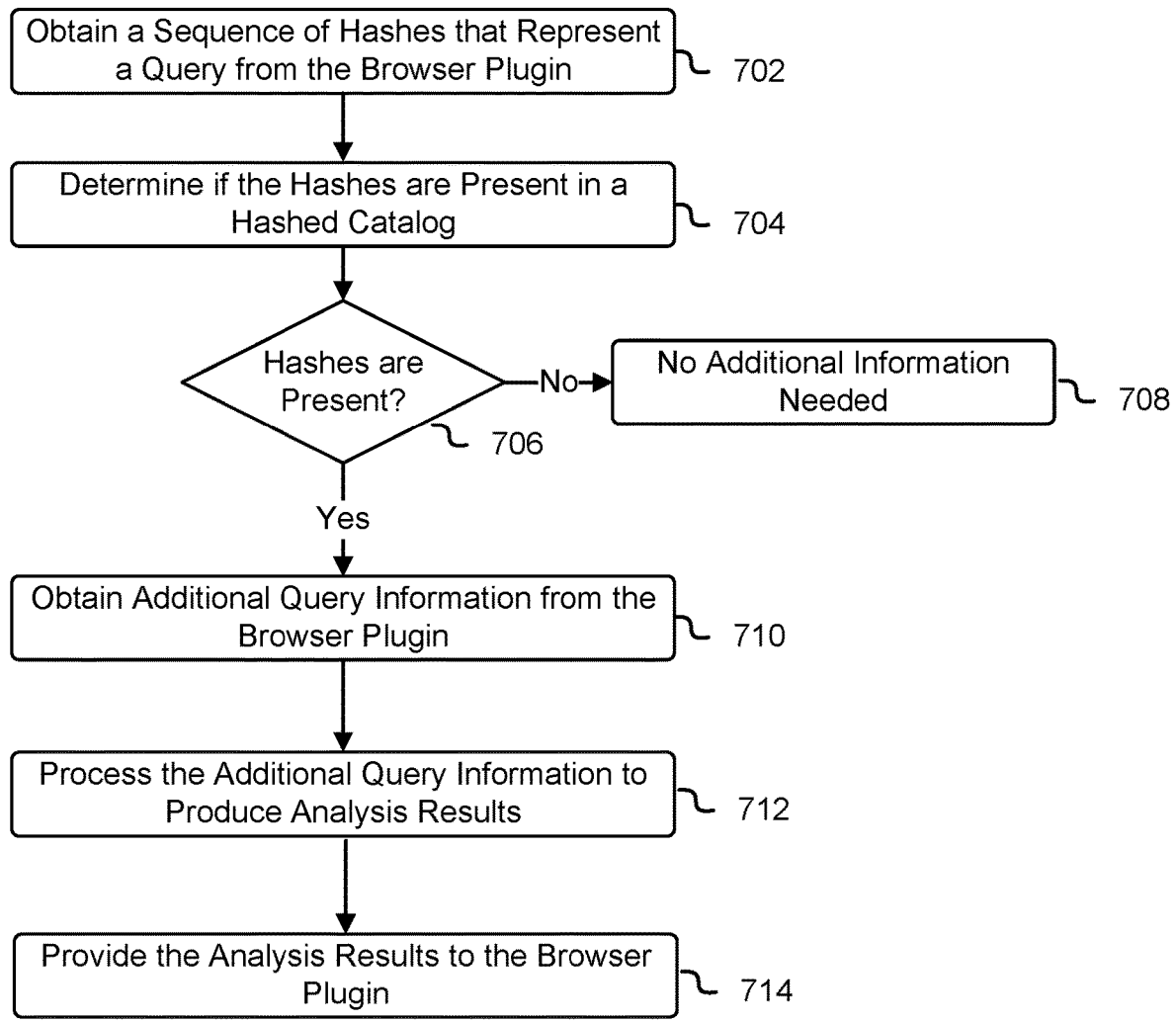
FIG. 7 illustrates a process that, as a result of being performed by an analysis service, produces an analysis using encoded user data, in an embodiment.

FIG. 7 illustrates a process that, as a result of being performed by an analysis service, produces an analysis using encoded user data, in an embodiment. The process begins at block 702 with the analysis service obtaining a sequence of hashes that represent a query from a browser plug-in hosted by a client computer system. In some examples, the sequence of hashes represents web page data retrieved by the browser. In other examples, the sequence of hashes represent textual data, tokenized data, or ordered numerical data. At block 704, the analysis service determines if the hashes are relevant to an analysis to be performed. In some examples this involves determining if the hashes represent data that is present in a catalog of information maintained by the analysis service. In other examples, determining if the information is relevant is based at least in part on distribution of the information on other databases or websites. In some implementations this is accomplished by comparing the hashes to a hashed version of the catalog or database. In other implementations, this is accomplished by providing the sequence of hashes to a trained neural network that has been trained to recognize whether the hashes represent information of interest to the analysis service. In one example, the neural network is trained to determine if the information item related, item relatedness can be indicated, for example, when the information describes a search for an item or service.

At decision block 706, if the analysis service determines, using the hashes themselves, that the hashes are present in the catalog and therefore that the information is of interest to the analysis, execution advances to block 710. At block 710, the analysis service requests additional information from the browser plug-in regarding information associated with the hashes. In some examples, the analysis service requests the plaintext of the information associated with the hashes. If, at decision block 706, the analysis service determines that the hashes represent information that is not of interest to the analysis, execution advances to block 708, and no additional information is requested by the analysis service. In some examples, the hashes are deleted at block 708.

At block 712, the analysis service processes the additional query information to produce an analysis. In some examples, the analysis identifies the particular item associated with the hashes, and then provides item-comparison information for the particular item. Item-comparison information can include costs at other providers, average costs, item reviews, availability information, as well as information relating to alternative items. At block 714, the analysis service provides the analysis results to the browser plug-in where they can be displayed to the user via a browser on the client computer system.

Figure 8:
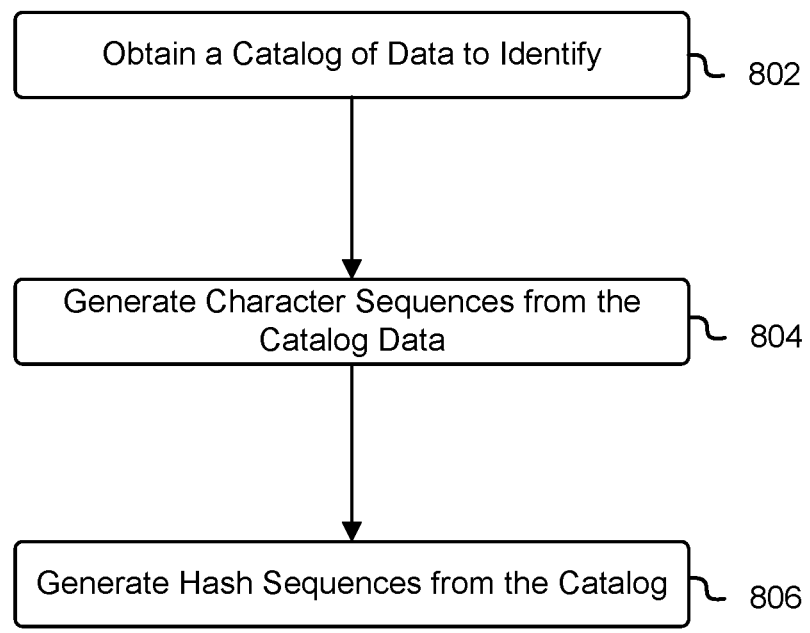
FIG. 8 illustrates a process that, as a result of being performed by an analysis service, generates a database for use in determining if a sequence of hashes corresponds to user data that requires analysis, in an embodiment.

FIG. 8 illustrates a process that, as a result of being performed by an analysis service, generates a database for use in determining if a sequence of hashes corresponds to user data that requires analysis, in an embodiment. In some implementations, the analysis service implements a mechanism for determining whether a set of hashes corresponds to data that requires analysis by training a machine-learning model to recognize hashes that correspond to such data. In other implementations, the analysis service implements the mechanism by hashing a database of data indicating item relatedness, and then comparing the hashes of the database to the hashes provided by the plug-in. The process illustrated in FIG. 8 illustrates an example of a method that uses a hashed catalog.

The process begins at block 802 with the analysis service obtaining a catalog of data to identify. At block 804, the analysis service divides the catalog of data into character sequences using the method described above with respect to the plug-in on the client. The character sequences are hashed at block 806, and the hashes stored as a hashed database or catalog. The hash mechanism used matches the hash mechanism used by the plug-in on the client. When a sequence of hashes is obtained by the analysis service, portions of the hashed database that match or similar to the sequence of hashes indicate that the sequence of hashes likely represents data of interest to the analysis service.

In some implementations, this is accomplished by training a neural network by hashing the contents of the catalog and then using the hashes as training data for training the neural network. When properly trained, the network is able to identify when a sequence of hashes provided to the network is one that is represented somewhere in the catalog.

Figure 9:
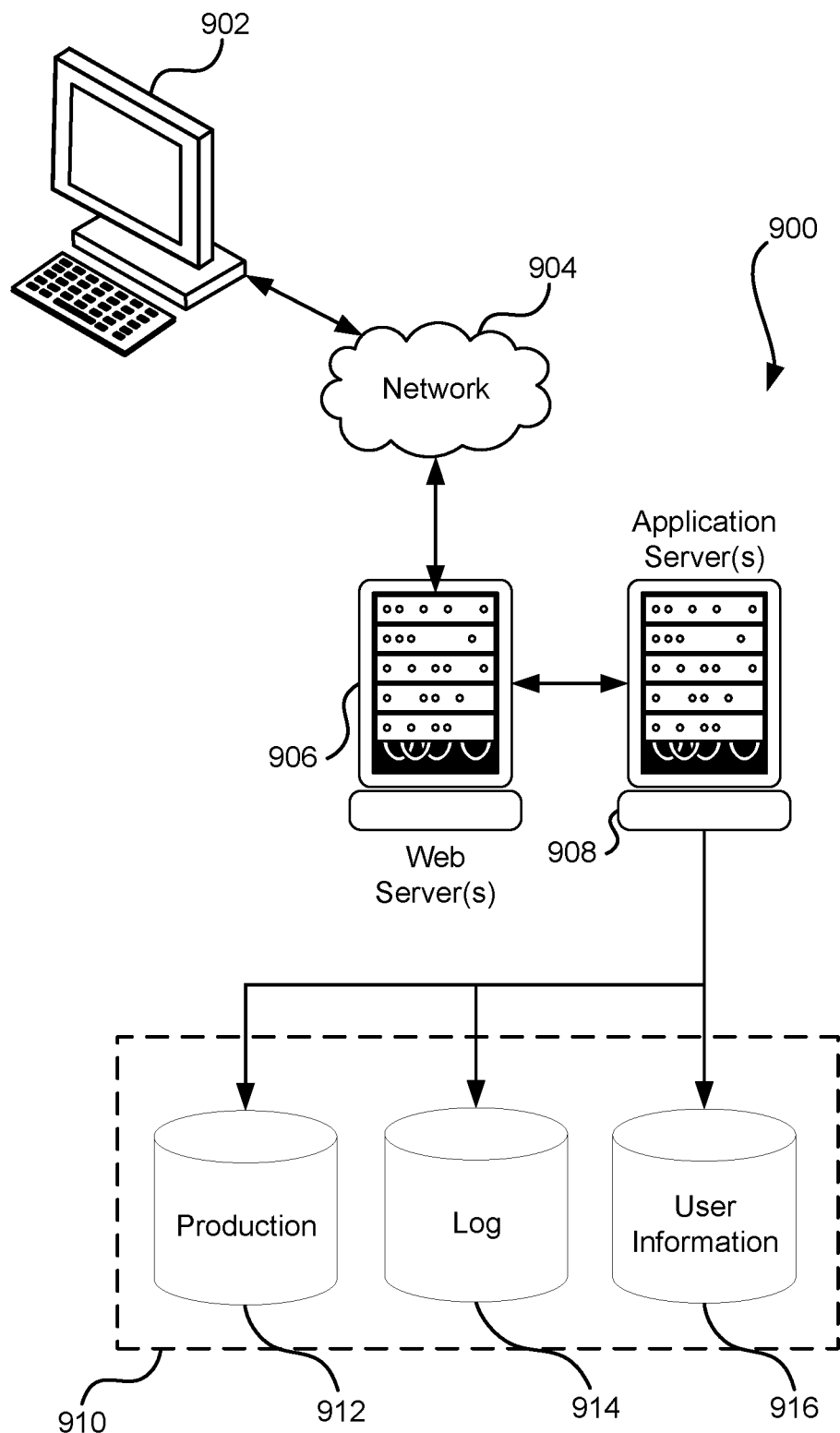
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and providing content in response thereto, although for other networks an alternative device providing a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing item data 912 and user information 916, which are used to serve content for the item side. The data store also is shown to include a mechanism for storing log data 914, which is used, in an embodiment, for reporting, computing resource management, analysis or other such purposes. In an embodiment, other aspects such as page image information and access information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, via a network, at a server computer system, a sequence of hashes where individual hashes in the sequence are generated from multi-character segments of web page data captured and normalized by a browser plug-in on a client computer system;
   determining, from the sequence of hashes, that the web page data identifies an item in a database;
   as a result of determining that the web page data identifies the item, request the web page data from the browser plug-in;
   identifying the item from the web page data;
   obtaining information related to the item from the database; and
   causing the information to be presented to a user of the client computer system by providing the information to the browser plug-in.

2. The computer-implemented method of claim 1, wherein an individual hash of the hashes represents an individual segment of a plurality of overlapping multi-character segments of the web page data.

3. The computer-implemented method of claim 1, wherein the web page data is a search query.

4. The computer-implemented method of claim 1, wherein the information includes sourcing information about the item.

5. A computer system, comprising:
   one or more processors; and
   memory that stores computer-executable instructions that are executable by the one or more processors to cause the system to implement one or more services, wherein the one or more services:
   obtain, via a network, a sequence of hashes generated from multi-character segments of data stored on a client computer system, wherein the multi-character segments of data are normalized;
   determine, from the sequence of hashes, to perform an analysis on the data using the one or more services;
   as a result of determining that the data is relevant, obtain the data from the client computer system; and
   perform the analysis of the data to produce analysis results.

6. The computer system of claim 5, wherein the one or more services further provide the analysis results to the client computer system.

7. The computer system of claim 5, wherein individual hashes are generated from individual 3-letter sequences from an ordered sequence of overlapping 3-letter sequences.

8. The computer system of claim 5, wherein the data is HTML, data from a web page obtained by a browser on the client computer system.

9. The computer system of claim 5, wherein:
the one or more services determines that the data is relevant by determining that the data identifies an item represented in a database; and
the database is stored on the computer system.

10. The computer system of claim 9, wherein:
the database stores hashed values; and
the hashed values are generated using an algorithm that corresponds to that used to generate the sequence of hashes.

11. The computer system of claim 9, wherein the database is a machine-learned model trained to recognize relevant data when provided with hashes of the relevant data.

12. The computer system of claim 5, wherein the hashes are received by the system via an encrypted network connection.

13. A non-transitory computer-readable storage medium storing thereon executable instructions that, as a result of being executed by one or more processors of a computer system, cause the computer system to:
obtain data collected via a web browser;
identify a sequence of character sequences within the data;
generate a sequence of hashes, where individual hashes of the sequence of hashes are generated from respective individual character sequences of the sequence of character sequences that are normalized;
provide the sequence of hashes to a service via a computer network; and
as a result of the service determining, from the sequence of hashes, that the data is relevant to an analysis, provide the data to the service.

14. The non-transitory computer-readable storage medium of claim 13, wherein the executable instructions further comprise instructions that, as a result of being executed by the one or more processors, cause the computer system to obtain, from the service, an analysis of the data produced by the service.

15. The non-transitory computer-readable storage medium of claim 14, wherein:
the data identifies an item; and
the analysis of the data includes sourcing information for the item.

16. The non-transitory computer-readable storage medium of claim 15, wherein the sourcing information includes cost information for the item.

17. The non-transitory computer-readable storage medium of claim 15, wherein the sourcing information identifies alternatives to the item.

18. The non-transitory computer-readable storage medium of claim 13, wherein:
the individual character sequences are three-letter sequences; and
sequential individual character sequences are overlapping.

19. The non-transitory computer-readable storage medium of claim 13, wherein the individual hashes of the sequence of hashes are cryptographic hashes of the respective individual character sequences.

20. The non-transitory computer-readable storage medium of claim 13, wherein the individual hashes of the sequence of hashes are based at least in part on checksums of the respective individual character sequences.

* * * * *